Aug. 14, 1956

W. FEW ET AL 2,759,139

CONTROL CIRCUITS

Original Filed Aug. 12, 1948

INVENTORS
WILLIAM FEW AND
JOHN D. SAUTER.
BY
Frederic B. Schramm
ATTORNEY.

INVENTORS.
WILLIAM FEW AND
JOHN D. SAUTER.
BY Frederic B. Schramm
ATTORNEY.

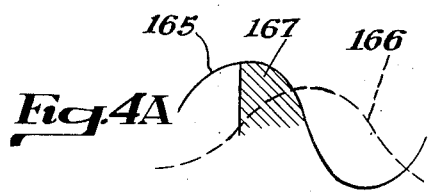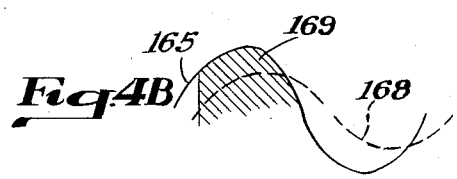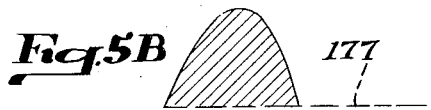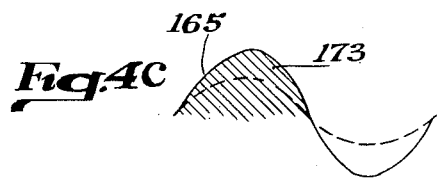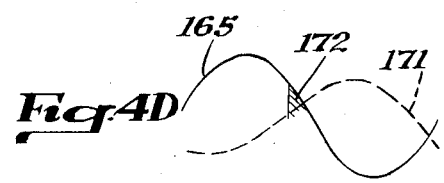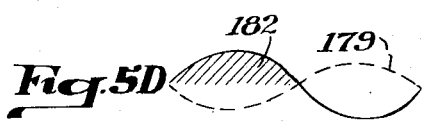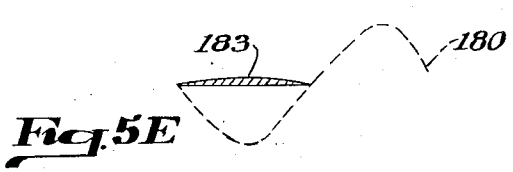

United States Patent Office 2,759,139
Patented Aug. 14, 1956

2,759,139

CONTROL CIRCUITS

William Few and John D. Sauter, Cleveland Heights, Ohio, assignors to The Clark Controller Company, Cleveland, Ohio, a corporation of Ohio Original application August 12, 1948, Serial No. 43,787, now Patent No. 2,664,529, dated December 29, 1953. Divided and this application April 6, 1953, Serial No. 347,188

6 Claims. (Cl. 321—16)

This application is a division of our co-pending application, Serial Number 43,787, filed August 12, 1948, now Patent No. 2,664,529. Our invention relates to electric curcuits for speed and current control.

An object of the invention is to obtain continuous variation in infinitesimal increments of an electric current in response to variations in position of a movable member. More specifically, it is an object to obtain such current variation in a direct-current circuit such as, for example, the direct-current winding of a saturable reactor. Furthermore, it is an object to render a saturable reactor, responsive continuously in infinitesimal increments to variations in position of a mechanical member such as the dancer arm of a multiple-block wire drawing machine.

Another object of the invention is to avoid hunting in the rotation of motor driven units such as the capstans of a multiple-block wire drawing machine and to obtain infinitesimal increments in the adjustment of speed of successive capstans, so that the dancer arms carrying loops of wire from one die to the next capstan may remain in a given position, without the necessity for constant working back and forth to obtain an average speed appropriate to the speed with which the next capstan draws the wire through the die.

Still another object of the invention is to obtain very rapid adjustment in the speed of motor driven unit such as the capstans appropriate to the speed of the succeeding motor driven units such as capstans while avoiding hunting.

Other and further objects, features and advantages of the invention will become apparent as the description proceeds.

In carrying out our invention in accordance with an improved embodiment thereof, we utilize manual control of the speed of the motor driving the last capstan of the series of multiple-block wire drawing machine, and the speeds of the motors driving the preceding capstans are automatically adjusted to the proper speed for the speed at which the last capstan draws the wire through the final die. Separate motors are employed for driving each capstan, and either a constant voltage, direct-current source may be employed for driving the motors or a variable voltage generator may be provided for energizing all of the capstan motors.

The motors are preferably compound wound direct-current motors having series fields and also having shunt fields. Conventional pivoted "dancer" arms, upon which are mounted pulleys for carrying the loops of wire from one capstan to the succeeding die, are provided for controlling the shunt field excitation of the preceding capstan motor at such a speed that the length of the loop neither increases nor decreases and the successive capstan speeds are proportional to the draft of the die between successive capstans. In order to obtain continuous speed variations with infinitesimal increments, to increase the reliability of speed control and the rapidity with which adjustments may be made, as well as to increase the sturdiness and life of the apparatus and avoid the difficulty of maintenance of contacts and rheostats, we provide electronic current control for the shunt fields of the motors.

In the preferred arrangement some of the field current is supplied from a constant potential source through a manually adjustable rheostat, which is ordinarily left in a fixed position, after the suitable adjustment has been ascertained and the adjustment of variation in field current is provided by a phase-responsive rectifier of the gas or vapor discharge type, commonly referred to as a "thyratron" type of rectifier. The phase control of the rectifier is made responsive to the angular position of the dancer arms, each dancer arm being arranged to control the field current of the motor driving the preceding capstan. The phase control may be obtained by a suitable phase shifter, such as a bridge type phase adjustor of the resistance-reactance type, for example, in which the magnitude of one of the electrical dimensions is adjusted for changing the phase. Preferably a saturable reactor is utilized as the reactance arm of the phase adjustor and the phase adjustment is accomplished by varying the direct-current flow through the direct current winding of the saturable reactor. If desired, however, a movable armature adjustable reactor may be employed in which the armature is mechanically linked to the dancer arm.

Where a saturable reactor type of phase adjustor is employed, an electronic type of current adjustor is preferable. We have found that precise, reliable and rapid adjustment of the direct-current in a saturable reactor responsive to movement of a movable member, such as the dancer arm, is preferably obtained by means of a vacuum tube type of rectifier with anticipating or anti-hunt circuits incorporated in the degenerative bias thereof, and having control grids excited by the secondary winding of a variable ratio transformer, the ratio of which is determined by the relative angular positions of the primary and secondary windings. For example a synchronous generator of the type sold as a "Selsyn" motor or generator may be employed in which the rotor is mechanically linked to the dancer arm of the wire block machine. In order that sensitivity adjustment and adjustment of the zero position of the dancer arm may be obtained electrically without requiring any change in mechanical linkage, a bridge type of connection is preferably interposed between the secondary winding of the variable ratio transformer and the grid circuit of the vacuum tube rectifier. Such bridge circuit includes a sensitivity adjustment potentiometer and a position adjustment potentiometer and a position adjustment potentiometer, as will be described more in detail hereinafter. Control circuits are also so arranged that full field is automatically applied to the capstan motor when the machine is started, independent of the position of the dancer arms.

A better understanding of the invention will be afforded by the following detailed description considered in conjunction with the accompanying drawing, in which Fig. 1 is a schematic diagram of a multiple-motor multiple capstan wire block machine in which the dancer arms are arranged for controlling motor speed in accordance with our invention;

Figure 2:
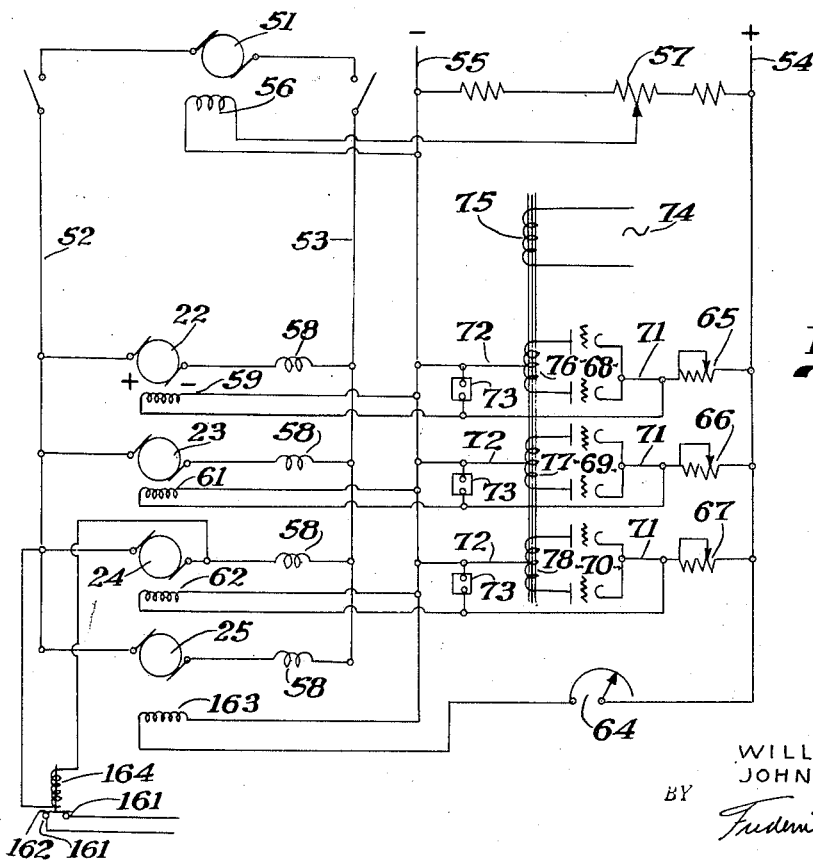
Fig. 2 is a circuit diagram of one form of electrical system which may be employed for driving the motors shown in Fig. 1 with details of the electronic field control circuits omitted for clarity in the drawing.
Figure 3:
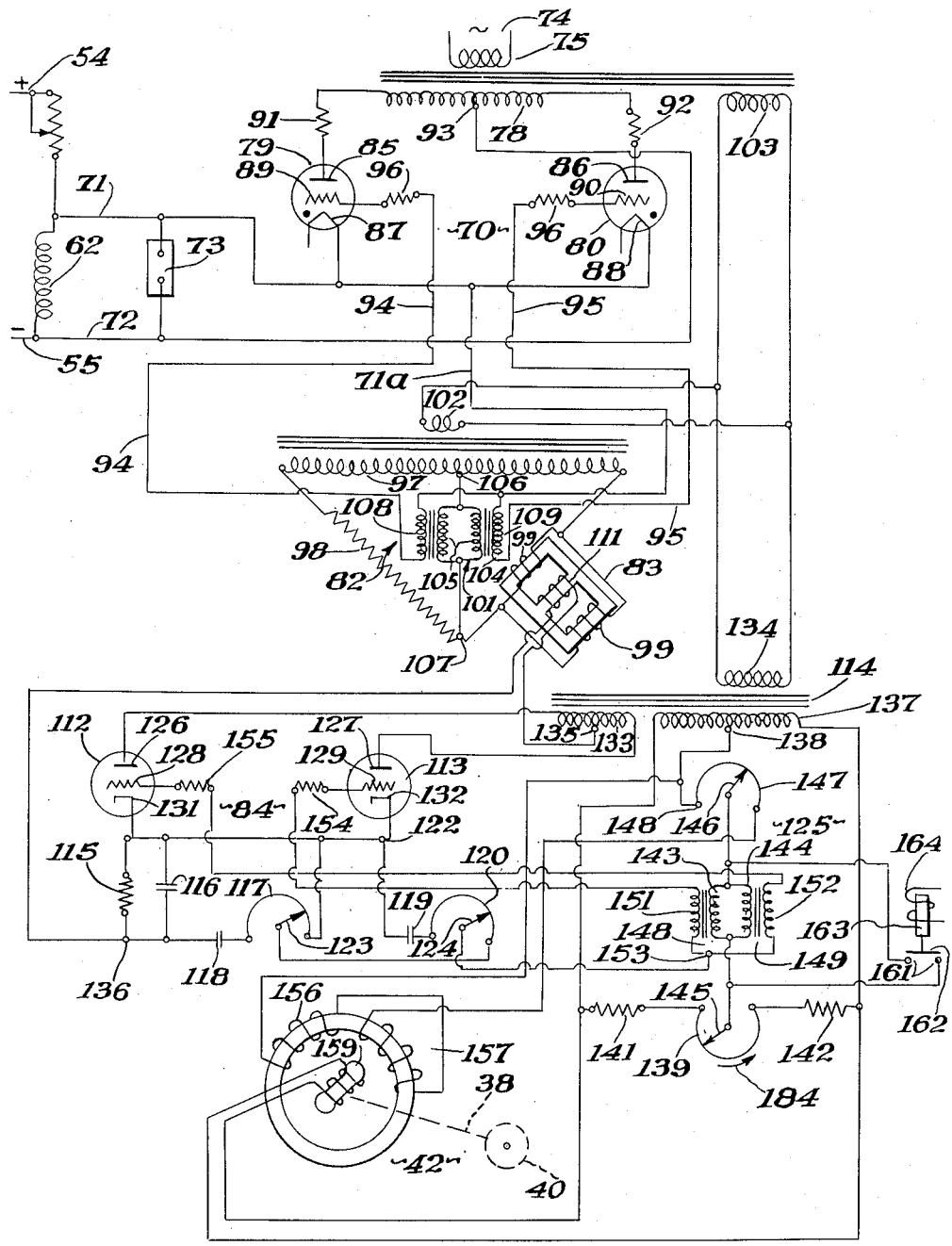
Fig. 3 is a detailed circuit diagram of the field current control circuit for one of the capstan driving motors other than the last capstan driving motor in accordance with an embodiment of our invention.

Figs. 4a, 4b, 4c and 4d are graphs, which illustrate the principle of operation of the vapor discharge type phase-responsive current-controlling rectifiers indicated in Fig. 2 and shown more clearly in Fig. 3, and which illustrate the operation for different positions of the dancer arm and different operating conditions of the wire block machine; and Figs. 5a, 5b, 5c, 5d, and 5e are graphs, which illustrate the principle of operation of the vacuum tube type direct-current regulator shown in Fig. 3 for regulating the magnitude of the current in the direct-current winding of the saturable reactor, and which illustrate the operation for different positions of the dancer arm and different positions of the mechanism for adjusting the control voltage of the current regulator.

Like reference characters are utilized throughout the drawing to designate like parts.

Wire block machines have been produced having dancer arms which operate sliding-contact field resistors for adjusting the speeds of capstan motors to maintain as nearly as possible constant lengths of the wire loop between one capstan and the succeeding die. Such arrangements having three or four capstan motors with automatically controlled speeds have been built and maximum wire speeds as high as one thousand feet (1,000 ft.) per minute have been obtained. It is an object of our invention not only to enable the speed of wire drawing to be greatly increased to about three thousand feet (3,000 ft.) per minute, for example, but also to enable wire drawing to be accomplished efficiently and without damage or breakage in connection with materials which are more difficult to draw, such as very hard wire, wire rope or stainless steel wire and the like. Furthermore, it is an object to facilitate increasing the amount of drafts which may be obtained with reliable operation. We may, for example, employ six or more separately controlled capstan driving motors having their speeds automatically controlled in accordance with our invention. For simplicity, however, in Fig. 1 we have shown an arrangement with only three capstan motors which are automatically controlled and a final-draw capstan motor which is manually adjusted to the desired output speed. The three preceding capstan motors illustrated adjust themselves automatically to the proper speeds for obtaining suitable operation of the machine in proportion to the speed of the final draw capstan. The manner in which additional non-illustrated automatically controlled capstan motors and their field controls would be arranged will be apparent to those skilled in the art.

Figure 1:
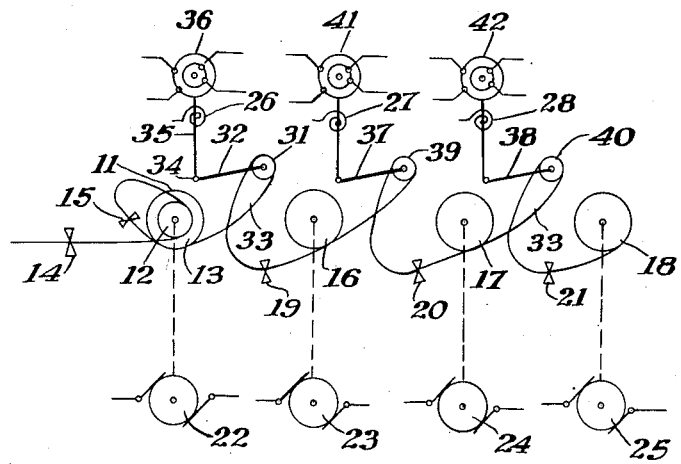

Referring to Fig. 1, we may, in accordance with frequent practice, employ a first capstan 11 having two different drums 12 and 13 so as to obtain a double draw through dies 14 and 15 in succession. Preferably, however, the succeeding capstans 16 and 17 and 18 are driven by separate motors and each follows a single die so that individual adjustment of the speed of draft through dies 19 and 20 and 21 may be obtained without slippage of wire on any of the capstans. The capstans 11, 16 and 17 are driven by motors 22, 23 and 24 respectively, each of which is provided with automatic field control in accordance with our invention and the capstan 18 is driven by a motor 25 having manual field control by which the output speed of the machine is determined.

A movable pulley carried by a spring-biased dancer arm is provided for carrying a loop of wire between each capstan and the succeeding die. Thus between the capstan 11 and the die 19 there is a movable pulley 31 mounted on a dancer arm 32 for carrying a loop of wire 33 passing from the drum 13 of the capstan 11 around the pulley 31 to the die 19. For keeping the wire loop 33 taut, a spring 26 is provided for the arm 32. The dancer arm 32 is pivoted at 34 upon a shaft 35 which is connected or otherwise linked to the rotor, not shown in Fig. 1, of an adjustable ratio transformer such as a "Selsyn" 36 for example. Similar spring-biased dancer arms 37 and 38 mechanically connected to "Selsyns" 41 and 42 are provided between the capstan 16 and the die 20 and between the capstan 17 and the die 21.

For energizing the motors 22, 23, 24 and 25 a constant potential, direct-current source or, if desired, a variable voltage system is utilized having a separate variable voltage generator for energizing all the motors of the block. For the sake of illustration, the latter type of system has been represented in Fig. 2, as shown, by a main generator 51 supplying the motors 22, 23, 24 and 25 through power conductors 52 and 53. A source of substantially constant-potential exciting current is provided having a positive terminal 54 and a negative terminal 55. The main generator 51 has a field winding 56 energized from the direct-current source 54 and 55 through suitable field adjusting rheostats or potentiometers, such as the potentiometer 57 as indicated. The same direct-current source 54—55 may be employed, as shown, for providing a portion of the shunt field current for the motors 22, 23, 24 and 25. These motors may, if desired, be of the compound wound type having series fields 58. The motors 22, 23, 24 and 25 also have potential field windings 59, 61, 62 and 63, respectively, which may be called shunt field windings by analogy to the conventional connection for compound wound motors. The motor 25, having manual speed adjustment, has its field winding 63 supplied entirely from the direct-current source 54—55 through a manually operated field rheostat 64 of the conventional type. The automatically controlled motors 22, 23 and 24 have their field windings 59, 61 and 62 connected to the source 54—55 in series with manually operated rheostats 65, 66 and 67, respectively. These rheostats 65, 66 and 67, however, are normally left in a fixed position during operation, and for obtaining field control, supplementary current supply sources 68, 69 and 70 are provided. These sources 68, 69 and 70 are of the electronic or vapor-discharge type and are indicated only fragmentarily in Fig. 2. Each of the current supply sources 68, 69 and 70, as shown, has positive and negative output conductors 71 and 72 connected across the motor shunt field winding and preferably a voltage-limiting discharge resistor 73 is also connected across the field winding.

Each of the discharge resistors 73 is composed of a material with the property of having a negative voltage coefficient of resistance, so that the voltage can rise relatively little above the predetermined value determined by the dimensions and arrangement of the resistor. These resistors may consist of so-called "Thyrite," or material having the composition described in Patent No. 1,822,742, McEachron.

Since the field current controlling devices 68, 69 and 70 are similar, a single detailed drawing of the complete circuit of one of them is shown in Fig. 3. They are all energized from a source of alternating current 74, and, if desired, a multiple-secondary transformer having a common core and a primary winding 75 may be provided with separate secondary windings 76, 77 and 78 for the regulators 68, 69 and 70 respectively. As illustrated in Fig. 3 the regulator 70 comprises, in combination with the transformer having the secondary winding 78, a pair of electric discharge devices 79 and 80, an excitation phase adjusting circuit 82 including a saturable core reactor 83, and a saturation controlling circuit 84 responsive to the angular position of the dancer arm 38. The discharge devices 79 and 80 are preferably of the gas or vapor discharge type in which current conductivity is maintained, so long as positive anode potential remains, once the grid or control electrode potential has been raised to a predetermined value, regardless of subsequent fluctuations in the grid potential. Such discharge devices are commonly referred to as "thyratron" tubes and the term "thyratron" will be used throughout the description and claims to refer to this type of electric discharge device or current controlling device. The thyratrons 79 and 80 comprise envelopes containing suitable gas or vapor, and enclosing plates or anodes 85 and 86, cathodes 87 and 88 (heater current sources being omitted for simplicity), and control electrodes or grids 89 and 90 respectively. In order that full wave rectification may be obtained a pair of thyratrons 79 and 80 is employed but our invention is not limited thereto.

In the arrangement illustrated, the anodes 85 and 86 are connected through suitable anode resistors 91 and 92 to opposite ends of the transformer winding 78. The cathodes 87 and 88 are connected to the positive input conductor 71 of the field winding 62, and the negative input conductor 72 of the field winding 62 is connected to a center tap 93 of the transformer secondary winding 78.

The phase adjustor 82 has a pair of variable phase output conductors 94 and 95 connected to the control electrodes 89 and 90 through current-limiting resistors 96.

The phase adjustor 82 in the form illustrated comprises a triangular bridge having a voltage supply arm 97, a resistance arm 98, a reactance arm 99 and a cross arm 101. The input voltage supply arm 97 constitutes a secondary winding of a transformer having a primary winding 102 supplied with voltage in the same phase as the voltage 74. For the purpose of circuit isolation, preferably a secondary winding 103 is provided on the core of the transformer 75 for energizing the phase shifter primary winding 102. For the sake of circuit isolation, also, the cross arm 101 takes the form of transformers 104 having primary windings 105 connected in parallel, the parallel group being connected at one end to a center tap 106 of the transformer winding 97 and at the other end to a common terminal 107 of the resistor arm 98 and the reactance arm 99. The transformers 104 have secondary windings 108 and 109 connected in the control electrode circuits respectively of the thyratrons 79 and 80, through the conductors 94 and 95, and a neutral conductor 71a.

The saturable reactor 83 comprises a pair of parallel connected alternating-current windings forming the reactance arm 99 and a direct-current winding 111. As will be understood by those skilled in the art, such saturable reactors commonly comprise three-legged cores with a direct-current winding wound on a center core, or an equivalent arrangement with the alternating-current windings connected so as to avoid inducing high voltage in the direct-current winding.

The saturating current controller 84 comprises a pair of high vacuum tubes 112 and 113 having control electrodes or grids such as triodes 6SN7G, e. g., with a plate or anode supply such as a transformer 114, and having control voltage supplied by the variable ratio transformer or "Selsyn" 42, energized by the same transformer 114, so as to preserve in-phase or out-of-phase relationship between the anodes and the grids of the tubes 112 and 113.

The tubes 112 and 113 are provided with a cathode bias resistor 115 shunted by a smoothing condenser 116. The capacity of the condenser 116, however, is sufficiently small so that appreciable degenerative effect is obtained. Preferably, anticipating circuits are interposed in the coupling of the control voltage to the control grids, in order to assist further in avoiding hunting. For example, a differentiating circuit may be provided comprising a potentiometer 117 and a condenser 118 connected in series across the cathode resistor 115 and an integrating circuit may be provided comprising a condenser 119 and a potentiometer 120 connected in series between the cathode terminal 122 and a tap or adjustable contact 123 of the potentiometer 117. The control voltage may be interposed between the tap or adjustable contact 124 of the potentiometer 120 and the control grids of the tubes 112 and 113, but preferably the control voltage is supplied through a bridge arrangement 125 in order that sensitivity adjustment and position adjustment may be provided.

The tubes 112 and 113 contain anodes 126 and 127, control electrodes 128 and 129 and cathodes 131 and 132 respectively. The anodes 126 and 127 are connected to opposite ends of a winding 133 forming a secondary winding in the transformer 114, the primary winding 134 of which may be energized from the winding 103 in common with the winding 102 of the phase shifting bridge 82. The direct-current winding 111 of the saturable reactor 83 is connected between the center tap 135 of the plate transformer winding 133 and the negative end terminal 136 of the cathode resistor 115.

The bridge circuit 125 comprises a supply winding 137 which is another secondary winding of the transformer 113 having a center tap 138, and a position adjusting potentiometer 139 connected across the winding 137, preferably with resistors 141 and 142 connected in series with both terminals. The cross arm of the bridge 125 comprises a pair of parallel connected primary transformer windings 143 and 144 connected between an adjustable tap 145 of the potentiometer 139 and an adjustable tap 146 of a sensitivity-adjustment potentiometer 147 having an end terminal 148 connected to the center tap 138 of the winding 137. The windings 143 and 144 constitute primary windings of transformers 148 and 149 having secondary windings 151 and 152, respectively. The secondary windings 151 and 152 have a common terminal 153 connected to the adjustable tap 124 of the potentiometer 120. The free ends of the transformer windings 151 and 152 are connected through current limiting resistors 154 and 155 to the control electrodes or grids 128 and 129 of the tubes 112 and 113 respectively.

The variable ratio transformer 42 in the form illustrated comprises an alternating-current dynamo electric machine having windings both on the stator and the rotor. To avoid unnecessary stocking of special parts, a device with a three-phase stator may be employed having three Y-connected coils for example. Only two of the Y-connected coils, 156 and 157, are shown in order to avoid confusion in the drawing. The rotor in the arrangement illustrated comprises a winding 159. Since the device is operated single phase, only one or two of the stator windings need be employed, and as illustrated, the coils 156 and 157 are connected in series across the sensitivity adjustment potentiometer 147 and the rotor winding 159 is connected across the input alternating-current supply, viz., the transformer secondary winding 137. As shown, the pivoted arm 38 or dancer arm is mechanically connected to the rotor 159. The invention obviously is not limited to the specific type of variable ratio transformer employed nor to the connection of the voltage input to the rotor and the voltage output terminals to the stator instead of vice versa.

As will be explained more in detail hereinafter, when the minimum or zero voltage appears across the primary windings 143 or 144 of the calibrating bridge 125, current flows in the direct-current winding 111 of the saturable reactor 83 and the phase responsive rectifiers 79 and 80 carry maximum current so as to supply full field to the motor, thus obtaining maximum torque or minimum speed of the motor and facilitating starting. This circumstance is taken advantage of to provide automatic safety arrangements for assuring that all motors of the multiple-block wire drawing machine will have maximum torque and a minimum speed when the apparatus is started up. Accordingly, a pair of normally closed contacts 161 is connected across transformer windings 143 and 144 of the calibrating bridge 125. The contacts 161 constitute stationary contacts cooperating with a movable contact 162 carried by a plunger 163 in inductive relation to a winding 164 connected to a suitable power circuit, for example, across the armature brushes of the motor in question, viz., the motor 24. (See Fig. 2.) Similar normally closed contacts are provided for the motors 22 and 23, but have been omitted from the description and drawing for the sake of simplicity.

A conventional arrangement, not shown, is likewise provided for the motor 25 to shunt out its manual field control resistor 64 when the apparatus is started.

Referring to Fig. 1, the first operation in starting the machine is, of course, starting a tapered end of wire through the dies 14, 15, etc. This operation is conventional and need not be further described. After the wire has been passed around the capstans and the movable pulleys 31, and upon supplying power through the armature, the normally closed contacts such as the contacts 161 are initially closed. This gives the motors maximum field and maximum torque. As soon as the motors have come up to speed sufficiently to produce a predetermined back voltage across the armature, the winding 164 is energized opening the contacts 161 and the operation of each of the automatically controlled motors 22, 23 and 24 proceeds under the control of the electronic field control circuits, such as that for the motor 24 illustrated in Fig. 3.

Referring to Fig. 1, if the capstan 17 is not rotating rapidly enough in relation to the capstan 18, the wire is being drawn into the die 21 more rapidly than it leaves the capstan 17. In other words the wire or other filar element in the rear is not being supplied rapidly enough in relation to the portion thereof in advance. Accordingly, the wire loop 33 is being shortened and the dancer arm 38 is drawn downward (with respect to the position illustrated in Fig. 1). This rotates the rotor 159 of the "Selsyn" type variable ratio transformer 42 toward the position in which the voltage output of the windings 156 and 157 is greater; accordingly, a greater voltage appears in the potentiometer 147. The voltage supplied to the primary windings 143 and 144 of the transformers 148 and 149 is increased and a greater voltage appears on the control electrodes 128 and 129 of the tubes 112 and 113. This decreases the average potential of the control grids, for the following reason. The characteristics of the tubes 112 and 113 are such that the grids cannot rise above cathode potential during positive half cycles of the control grid voltage, and accordingly only the negative half cycles of control grid voltage are effective. The output of the tubes 112 and 113 is decreased with decreasing average grid potential, thus decreasing the flow of direct-current through winding 111 of the saturable reactor 83. This in turn increases the reactance of this winding and increases the phase shift produced by the phase adjusting bridge 82.

Thereupon the anodes and the control grids of the thyratron tubes 79 and 80 are brought out of phase, the current output thereof is decreased, the field strength of the motor 24 is decreased and the speed increases. This enables the capstan 17 to supply wire at a greater speed and enables the wire loop 33 to increase in length again until the dancer arm 38 has found an angular position at which the ratio of the speed of the capstan 17 to the speed of the capstan 18 equals the reciprocal of the draft through the wire die 21.

In a similar manner the speed of the capstan 16 is automatically adjusted to take the proper relation to the speed of the capstan 17 and the speed of the capstan 11 is adjusted to take proper relation to that of the capstan 16. Excessive change speed and overshoot is avoided by reason of the anti-hunt or anticipating circuits in the grid control 84. Thus, if the arm 38 should be moved abruptly as a result of an abrupt change in the manual setting of the motor 25 or for another reason, a degenerative or opposing change in control voltage of the grids 128 and 129 will be produced as a result of the change in current flow through the partially degenerative cathode resistor 115 applied to differentiating circuit 117—118, partially modified by the integrating circuit 119—120. These circuits are so connected that they produce an opposing effect which increases with abruptness of the actual change and holds back the speed correction of the motor in order to enable conditions to stabilize.

The manner in which the phase responsive rectifiers 79 and 80 function to control field current in response to variations in phase of the grids is illustrated in Figs. 4a to 4d, wherein the sine wave curves 165 illustrate the voltage applied to the anode of one of the tubes, for example the anode 85 of the tube 79, by the transformer winding 78. The dotted sine wave 166 represents the voltage applied to the control grid 89 from the phase shifting bridge network 82 when the current flowing in the winding 111 of the saturable reactor 83 is such as to balance the reactance of the winding 99 against the resistance of the winding 98 and produce a quadrature relationship between the grid voltage 166 and the anode voltage 165. As will be understood by those skilled in the art, the current flow in the tube 79 is extinguished whenever the anode voltage 165 falls below zero. The flow of current can be resumed again when the anode voltage 165 rises above zero only when the grid potential is above a predetermined value, ordinarily slightly below but quite close to zero and depending upon the amplitude of the anode voltage.

Thus in the case illustrated in Fig. 4a, the control grid voltage 166 does not reach the ignition voltage until at or very nearly at the time corresponding to one-quarter wave length after the beginning of the wave 165. Thereupon the tube 79 becomes conducting and remains conducting, as illustrated by the shaded portion of the sine wave 167, until the wave 165 falls to zero. If the control grid voltage had lagged less behind the anode voltage, as illustrated by the dotted since wave 168 in Fig. 4b, the tube would have become conductive sooner, as illustrated by the shaded portion 169. Since the tube is conducting for a longer period of time, the average current flow is greater and the average direct-current flowing through the motor field is greater, resulting in lower motor speed and resulting in degenerative braking if the motor has been traveling at a speed greater than the running-light speed which would be produced by the new field adjustment illustrated in Fig. 4b.

On the other hand, if the control grid voltage is considered to lag considerably behind the anode voltage, as illustrated by the dotted sine wave 171 in Fig. 4d, the tube conducts current for a relatively short portion of the cycle represented by the shaded area 172, and the average field current is reduced and the motor speed is increased. At starting, when the windings 143 and 144 are short-circuited by the normally closed contacts 161, a maximum current flows through the tubes 112 and 113. The core of the saturable reactor 83 is so highly saturated that it has negligible reactance so that the output voltage is very nearly in phase with the input voltage, that is to say, the anode and the grid voltages of the thyratron tubes are very nearly in phase, as illustrated in Fig. 4c, and maximum current full field is produced as shown by the shaded area 173.

In Fig. 5a the curve 176 represents the anode voltage applied by the transformer winding 133 to one of the vacuum tubes, for example, the vacuum tube 112. The tube does not conduct current through the negative half cycles of anode voltage so that the potential of the grid during such negative half cycles is immaterial. The grid voltage cannot rise above cathode voltage during the positive half cycles of the anode voltage because grid current would then start to flow, resulting in voltage drop through the current limiting resistor 155. Accordingly, the current output of the tube is determined by the amplitude of the negative voltage applied to the control grid during the positive half cycles of anode voltage. Such tubes conduct current in decreasing value as the grid potential is reduced or the negative grid voltage is made greater to a certain value called the "cut-off" value at which the current flow becomes zero. Thus, as illustrated in Fig. 5b, when the voltage input to the control grid 128 is substantially zero, as shown by the dotted line 177, a maximum anode current half cycle is produced. On the other hand, with progressively greater values of control grid voltage represented by increasingly large-amplitude sine waves 178, 179 and 180, progressively smaller values of anode current are caused to flow, as represented by the progressively smaller shaded areas 181, 182 and 183.

The voltage output of the variable ratio transformer 42 is tapped off by the adjustment contact 146 of the potentiometer 147, of the calibrating bridge 125 shown in Fig. 3. Consequently, the amplitude of response obtained by rotation of the rotor 159 depends upon the position of the tap 146. Accordingly, this potentiometer serves as the sensitivity adjustor.

The control grid voltage for the tubes 112 and 113 is taken from the transformers 148 and 149 and these are connected in the bridge cross arm between the center tap 138 of the supply winding 137 and the adjustable tap 145 of the position adjusting potentiometer 139. Therefore, the magnitude and phase of the voltage output of the variable ratio transformer 42, required to produce zero voltage output from the windings 151 and 152, depends upon the angular position of the tap 145. For example, if this is placed at such a position that its potential equals the potential of the center tap 138, the voltage output of the windings 151 and 152 will be zero when the rotor 159 is in a predetermined angular position with respect to the stator windings 156 and 157. Rotation of the dancer arm 38 in a given direction will then increase the voltage and rotation of the dancer arm in the opposite direction will also increase the voltage but in opposite phase relation.

If it is desired to set back the angular position of the dancer arm 38, which results in zero voltage output at the windings 151 and 152, this is accomplished by moving the potentiometer adjustable tap 145 to the left so as to increase the output potential of the windings 151 and 152 with respect to the tap 148 of the potentiometer 147. Accordingly, it is then necessary for the arm 38 to move back introducing an out-of-phase potential neutralizing that produced by the arm 145 of the position adjusting potentiometer 139 in order to obtain a zero output from the windings 151 and 152. Likewise, moving the arm in the opposite direction, viz., in the direction of the arrow 184, has the effect of advancing the position of the arm 138 at which a predetermined current flow from the tubes 112 and 113 is obtained.

It will thus be observed that a fully electrical control is obtained and no mechanical adjustments whatsoever are required for adjusting the angular positions of the dancer arms at which they maintain the desired speed relation, nor for adjusting the angular movement of the dancer arms required to produce predetermined variations in speed, as these adjustments are accomplished electrically by the potentiometers 139 and 147. Furthermore, the adjustment of the degree of sluggishness or quickness of response in the change of motor speed and the change in speed of the draft of wire by the succeeding capstan, is accomplished by adjustment of the anti-hunt potentiometer arms 123 and 124 to give the desired degree of first and second order anticipation. In this manner overshoot in the correction of speed, and, therefore, hunting are overcome. Since the control of motor speeds is fully automatic and may be made to respond very rapidly without hunting, wire may be drawn safely and reliably at very high rates of speed.

Certain embodiments of the invention and certain methods of operation embraced therein have been shown and particularly described for the purpose of explaining the principle of operation of the invention and showing its application, but it will be obvious to those skilled in the art that many modifications and variations are possible, and it is intended, therefore, to cover all such modifications and variations as fall within the scope of the invention which is defined in the appended claims.

I claim:

1. A circuit for controlling the strength of current through a direct-current winding comprising in combination with such winding, a pair of alternating-current supply terminals, a vacuum-tube type direct-current controller having an anode-cathode circuit connected to said alternating-current terminals having control electrode means, a variable ratio transformer having a rotor the position of which determines the voltage ratio, said transformer having a secondary winding connected to said control electrode means, a degenerative resistor for said controller, an anti-hunt differentiating circuit interposed between said variable ratio transformer secondary winding and the control electrode means, and a conductor connecting said direct-current winding in series with the anode-cathode circuit of said controller.

2. A direct-current controller comprising in combination with a pair of alternating-current input terminals a high vacuum tube circuit having anode and cathode means connected in series with said terminals and having control electrode means, a variable ratio transformer having relatively movable primary and secondary windings, the primary windings being energized in the same phase relation with said alternating-current input terminals, a coupling between the secondary winding and said control electrode means, a degenerative resistor in the cathode connection of said vacuum tube circuit, an anti-hunt differentiating circuit interposed in the coupling between said variable ratio transformer secondary winding and the control electrode means, and terminals for connecting a direct-current device to be controlled in series with said anode-cathode circuit.

3. A direct-current controller comprising in combination with a pair of alternating-current input terminals a high vacuum tube circuit having anode and cathode means connected in series with said terminals and having control electrode means, a variable ratio transformer having relatively movable primary and secondary windings, the primary windings being energized in the same phase relation with said alternating-current input terminals, a coupling between the secondary winding and said control electrode means, a degenerative resistor in the cathode connection of said vacuum tube circuit, and terminals for connecting a direct-current device to be controlled in series with said anode-cathode circuit.

4. A direct-current controller comprising in combination with a pair of alternating-current input terminals a high vacuum tube circuit having anode and cathode means connected in series with said terminals and having control electrode means, a variable ratio transformer having relatively movable primary and secondary windings, the primary windings being energized in the same phase relation with said alternating-current input terminals, a coupling between the secondary winding and said control electrode means, a degenerative resistor in the cathode connection of said vacuum tube circuit, an anti-hunt differentiating circuit interposed in the coupling between said variable ratio transformer secondary winding and the control electrode means, terminals for connecting a direct-current device to be controlled in series with said anode-cathode circuit, a sensitivity adjustment potentiometer interposed between the secondary winding of the variable ratio transformer and the control electrode coupling, and a position adjustment potentiometer interposed in the input connections to said primary winding for adjusting the relative angular position of the winding of the said variable ratio transformer at which minimum excitation of the control electrode means is obtained.

5. A direct-current controller comprising in combination with a pair of alternating-current input terminals a high vacuum tube circuit having anode and cathode means connected in series with said terminals and having control electrode means, a variable ratio transformer having relatively movable primary and secondary windings, the primary windings being energized in the same phase relation with said alternating-current input terminals, a coupling between the secondary winding and said control electrode means, terminals for connecting a direct-current device to be controlled in series with said anode-cathode circuit, a sensitivity adjustment potentiometer interposed between the secondary winding of the variable ratio transformer and the control electrode coupling, and a position adjustment potentiometer interposed in the input connections to said primary winding for adjusting the relative angular position of the winding of the said variable ratio transformer at which minimum excitation of the control electrode means is obtained.

6. A direct-current controller comprising in combination with a pair of alternating-current input terminals a high vacuum tube circuit having anode and cathode means connected in series with said terminals and having relatively movable primary and secondary windings, the primary windings being energized in the same phase relation with said alternating-current input terminals, a coupling between the secondary winding and said control electrode means, an anti-hunt differentiating circuit interposed in the coupling between said variable ratio transformer secondary winding and the control electrode means, and terminals for connecting a direct-current device to be controlled in series with said anode-cathode circuit.

UNITED STATES PATENTS

References Cited in the file of this patent

| | | |
|---|---|---|
| 993,843 | Kruh | May 30, 1911 |
| 1,809,625 | Griggs | June 9, 1931 |